United States Patent Office 3,248,378
Patented Apr. 26, 1966

3,248,378
POLYOLEFIN-CHELATE COMPOSITIONS HAVING IMPROVED DYE RECEPTIVITY
Horst Behrenbruch, Kelkheim, Taunus, Wilhelm Happe, Schwalbach, Taunus, Gerhard Freitag, Niederhofheim, Taunus, and Hans Hoyer, Frankfurt am Main, Germany, assignors to Farbwerke Hoechst Aktiengesellschaft vormals Meister Lucius & Bruning, Frankfurt am Main, Germany, a corporation of Germany
No Drawing. Filed Oct. 8, 1962, Ser. No. 229,170
Claims priority, application Germany, Oct. 10, 1961, F 35,102
4 Claims. (Cl. 260—93.7)

The present invention relates to a process for the manufacture of improved shaped articles of linear polyolefins.

Linear polyolefins obtained by the polymerization of olefins, for example, linear polyethylene and polypropylene, are difficult to color. To remove this drawback, the polyolefins are admixed, before being worked up into shaped articles, with polyvalent metals such as nickel, cobalt, chromium, titanium and zirconium or their oxides, hydroxides and sulfates.

Such additions have the disadvantage, however, that they give rise to a decomposition of the polyolefins so that the forming of such polyolefins is often beset with difficulties. Moreover, the temperature stability of the shaped articles, especially filaments and fibers, is insufficient.

Now we have found that shaped articles such as filaments and films or sheets of linear polyolefins, for example polyethylene or polypropylene, which have particularly good dye receptivity, can be obtained by adding to the polyolefins to be worked up 0.7 to 3% by weight, advantageously 0.5 to 2% by weight, of chromium stearate, aluminum stearate or chromium acetyl acetonate of the following Formula 1.

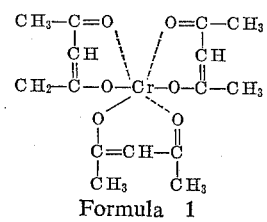

Formula 1 or aluminum acetyl acetonate of the following Formula 2

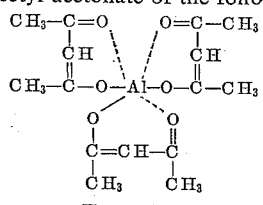

Formula 2 or the chromium salt of the acetoacetic ester of the following Formula 3

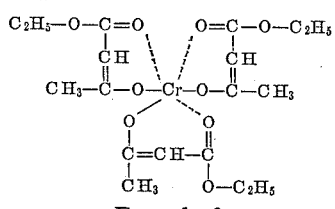

Formula 3 or the aluminum salt of the acetoacetic ester of the following Formula 4

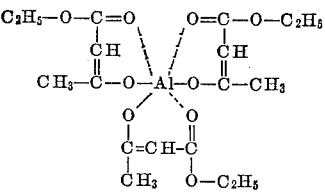

Formula 4

The aforesaid substances may also be used in admixture with one another, the mixtures being added to the polyolefins in the above mentioned amounts.

By the addition of the aforesaid compounds in accordance with the invention, the dye receptivity of the polyolefins is improved to a surprisingly high degree, without the other properties of the polyolefins, for example viscosity, ultimate tensile strength, elongation at break and bending strength, being impaired. Nor does the addition of the said compounds interfere with the working up of the polyolefins into filaments or filters from the melt.

The above mentioned chromium or aluminum compounds are advantageously added to the polyolefins in a manner such that the polyolefins and the chromium or aluminum compounds are intimately mixed in a finely ground form. When the mixture so obtained is melted, the chromium or aluminum compounds are distributed in the polyolefin in a completely homogeneous manner. It is also possible, however, to prepare the mixture by impregnating the granulated or powdered polyolefin with a solution or dispersion of the chromium or aluminum compounds, removing the solvent by evaporation and then thoroughly mixing the polyolefin on which the compounds have been left behind. Alternatively, first a mixture of a polyolefin containing a relatively high portion of the above mentioned compounds is prepared, the mixture is then melted, the melt is spun into a band which is worked up into chips (small pieces) which, in turn, are added to the remaining portion of the polyolefin prior to the working up of the polyolefin so that a mixture having a desired content of chromium or aluminum compounds in a given case is obtained.

The following examples serve to illustrate the invention but they are not intended to limit it thereto, the parts being by weight.

*Example 1*

995 parts of powdered polypropylene having a relative viscosity of 1.8 (determined on a 0.1% solution in decahydronaphthalene at 135° C.) were intimately mixed with 5 parts of aluminum stearate in a fluid mixer. The mixture was spun into yarns at 270° C. with the use of a heated screw extruder. The yarns had a titre of 270 deniers and consisted of 24 individual filaments. The filaments were drawn off from the spinning nozzle at a rate of 1000 meters per minute. The filaments were then drawn at a temperature within the range of 90 to 110° C. in a ratio of 1:3.65. The drawn filaments had an ultimate tensile strength of 3.6 grams per denier and an elongation at break of 25%. They could be well colored with the following dyestuffs:

Alizarine Yellow GG (Schultz, "Farbstofftabellen," 7th edition, No. 55)
Mordant Yellow 3R (Schultz, "Farbstofftabellen," 7th edition, No. 66)
Alizarine Cyanine RR (Schultz, "Farbstofftabellen," 7th edition, No. 1172)
Alizarine Orange P (Schultz, "Farbstofftabellen," 7th edition, No. 1143).

*Example 2*

99 parts of granulated polypropylene having a relative viscosity of 2.1 (determined as described in Example 1) were intimately mixed with 1 part of powdered aluminum stearate dispersed in 19 parts of methanol. The methanol was then removed from the mixture by evaporation and the mixture was stirred again. The granules were worked up from the melt in the manner described in Example 1. The filaments so obtained had an ultimate tensile strength of 3.3 to 3.5 grams per denier and an elongation at break of 21 to 25%. The filaments could be well colored with the dyestuffs mentioned in Example 1.

*Example 3*

995 parts of powdered polypropylene having a relative viscosity of 2.1 (determined as described in Example 1) were intimately mixed with 5 parts of chromium stearate in a fluid mixer. The mixture was worked up to filaments as described in Example 1. The filaments so obtained had good technological properties and could be well colored with the dyestuffs mentioned in Example 1.

*Example 4*

99 parts of powdered polypropylene having a relative viscosity of 1.9 (determined as described in Example 1) were intimately mixed with 1 part of chromium stearate in a fluid mixer. The mixture was made into filaments as described in Example 1. The filaments so obtained had good technological properties and could be well colored with the dyestuffs mentioned in Example 1.

*Example 5*

995 parts of polypropylene having a relative viscosity of 1.8 (determined as described in Example 1) were mixed with 5 parts of aluminum acetyl acetonate as described in Example 1 and worked up into filaments. The filaments so obtained had an ultimate tensile strength of 3.5 to 4.0 grams per denier and an elongation at break of 25 to 35%. They could be well colored deep shades with the dyestuffs mentioned in Example 1.

*Example 6*

99 parts of granulated polypropylene having a relative viscosity of 2.1 (determined as described in Example 1) were intimately mixed with 1 part of aluminum acetyl acetonate dispersed in 19 parts of methanol. The methanol was subsequently removed from the mixture by evaporation and the mixture was stirred again. The granules were worked up from the melt as described in Example 1. The filaments so obtained had an ultimate tensile strength of 3.5 to 4.0 grams per denier and an elongation at break of 25 to 35%. They could be well colored with acid dyestuffs.

*Example 7*

995 parts of powdered polypropylene having a relative viscosity of 2.1 (determined as described in Example 1) were intimately mixed with 5 parts of chromium acetyl acetonate in a fluid mixer. The mixture was made into filaments as described in Example 1. The filaments so obtained had good technological properties. They could be well colored with the dyestuffs mentioned in Example 1. The filaments had an ultimate tensile strength of 3.5 to 4.0 grams per denier and an elongation at break of 25 to 35%.

*Example 8*

99 parts of powdered polypropylene having a relative viscosity of 1.9 (determined as described in Example 1) were intimately mixed with 1 part of chromium acetyl acetonate in a fluid mixer. The mixture was made into filaments as described in Example 1. The filaments so obtained had an ultimate tensile strength of 3.5 to 4.0 grams per denier and an elongation at break of 25 to 35%. The filaments could be colored deep shades with the dyestuffs mentioned in Example 1.

We claim:
1. In a process for the manufacture of dye receptive shaped articles of a polyolefin selected from the group consisting of polyethylene and polypropylene comprising adding to the polyolefin before it is processed into a shaped article a compound for improving the dye receptivity of said polyolefin, and processing the mixture into shaped articles, the improvement of adding as said compound 0.1 to 3% of a compound selected from the group consisting of chormium acetyl acetonate, aluminum acetyl acetonate, chromium acetoacetic ester and aluminum acetoacetic ester.
2. The process of claim 1 wherein 0.5–2.0% of said compound is added to the polyolefin.
3. The composition of matter according to claim 4 wherein said composition contains 0.5–2.0% of said metal compound.
4. A dye receptive composition of matter from which shaped articles are formed consisting essentially of a polyolefin selected from the group consisting of polyethylene and polypropylene containing 0.1 to 3% by weight of a metal compound selected from the group consisting of chromium acetyl acetonate, aluminum acetyl acetonate, chromium acetoacetic ester and aluminum acetoacetic ester.

References Cited by the Examiner
UNITED STATES PATENTS

| | | | |
|---|---|---|---|
| 2,984,634 | 5/1961 | Caldwell et al. | 260—23 |
| 3,164,438 | 1/1965 | Thomas | 8—55 |
| 3,169,043 | 2/1965 | Baumgartner | 8—55 |
| 3,169,823 | 2/1965 | Gagliardi | 8—55 |

DONALD E. CZAJA, *Primary Examiner.*
LEON J. BERCOVITZ, *Examiner.*